UNITED STATES PATENT OFFICE.

FREDERICK J. POPE AND ALBERT WILLIAM HAHN, OF DOUGLAS, ARIZONA.

PROCESS OF RECOVERING COPPER.

1,232,080.   Specification of Letters Patent.   Patented July 3, 1917.

No Drawing.   Application filed July 29, 1914.   Serial No. 853,809.

*To all whom it may concern:*

Be it known that we, FREDERICK J. POPE, a subject of the King of Great Britain, and ALBERT WILLIAM HAHN, a citizen of the United States, both residing at Douglas, in the county of Cochise and State of Arizona, have invented certain new and useful Improvements in a Process of Recovering Copper, of which the following is a specification.

This invention relates to a method of recovering copper by the electrolysis of copper solutions of any suitable kind, obtained by the lixiviation of the ore; and it consists in the operations and sequence of operations set forth in the specification.

We contemplate a treatment of the ore in the usual manner. Accordingly, if the ore is an oxid, or one which contains no compound of copper with sulfur, it can be treated direct with the leaching solution. If the copper is present as a sulfid the ore must first be roasted in order to make the copper soluble in the lixiviant. The ore is crushed and if necessary roasted so that the copper is in the form of oxids and sulfates. A body of this ore is then treated with a weak solution (about two and one-half per cent.) of free sulfuric acid, by any usual or preferred method, as, for instance, downward percolation, upward percolation, continuous decantation, filter pressing or agitation. This converts the copper into the form of sulfate, and this, in solution, is run off to the usual electrolytic tanks where the copper is recovered in the form of metal, while sulfuric acid is incidentally produced to be used over again in the further treatment of the ore, or in the treatment of further quantities of ore.

After the process has gone on for a time, and the lixiviant has circulated through the ore a number of times, the solution will be found to carry not only too much iron in the form of sulfate, but also aluminum sulfate, arsenic, lime, bismuth, antimony, alkalis, magnesium, vanadium, manganese, or other impurities which may exist in the ore and are soluble in the lixiviant. When this condition arises, the continuous oxidation of the iron at the anode, and the reduction of the iron at the cathode by the copper itself, causes a great reduction of the ampere efficiency, and a stage may even be reached (depending upon the amount of iron in the solution and upon the current density used) when no copper will be recovered. It has been found that an acid-copper sulfate solution containing one-half of one per cent. of iron can be electrolyzed, using a current density of fifteen to twenty amperes per square foot of cathode surface, and an ampere efficiency of ninety per cent. may be obtained. In order to keep the proportion of iron in the leaching solution at this point, or at any point consistent with economy, we prefer to employ the following method:

A portion of the solution coming off the ore is withdrawn from the circuit, the amount of solution so withdrawn depending of course upon the amounts of iron necessary to be removed. This solution will contain some free acid, which will be neutralized by treating it cold in suitable tanks with the residues from a previous agitating operation, hereinafter described, such residues still containing some copper oxid or basic sulfates. The neutral or almost neutral withdrawn portion of the solution containing the iron, aluminum, arsenic, and other impurities, is then heated in a suitable tank with live steam, superheated steam, waste steam, heated air, or any other means, and agitated with air. Finely ground copper-oxid-bearing material is then added in quantity sufficient to precipitate all, or a portion of, the iron, and the agitation and heating is kept up over a period of from two to five hours. The solution in the tank is then allowed to settle, the clear liquid is drawn off and the residues are filter pressed and washed to be subsequently used for neutralizing a fresh batch of the solution drawn off from the circulation, as already described.

By this described treatment, all, or a part of the iron, aluminum, arsenic, antimony, bismuth, manganese, nickel, cobalt and vanadium are eliminated, the sulfuric acid which was combined with these elements is recovered in the form of copper sulfate, and the withdrawn portion of solution, now clear and free from, or lower in, objectionable impurities, and enriched in copper, goes to a separate series of electrolytic tanks, where the copper is recovered and the sulfuric acid regenerated. This high acid solution is used for what we may call the "strong" solution which is used after the limit of efficiency of the two and one-half per cent. solution upon the ore is reached, that is, when the copper in the solution coming off remains about constant in quantity.

The elimination of the aluminum sulfate from the leaching solution is quite important, because the aluminum sulfate, contrary to what might be expected, precipitates out in the ore column and clogs it up so that percolation cannot take place so readily as is desirable.

If there is a loss of sulfuric acid during the leaching operation, this can be made up by properly conducting the roasting of the copper-bearing material if the latter contains sulfur in some form; or the sulfur may be added either as elementary sulfur or in the form of a mineral sulfid such as pyrites, or as copper bearing sulfid, so that some of the copper is converted into copper sulfate and basic copper sulfate, which will go into solution and give up its sulfuric acid upon electrolyzing, and in this way make up for that which was lost on account of impurities in the ore, entrainment in the tailings and loss in the wash water.

The leaching is done in tanks as stated. The regenerated solution from the electrolytic precipitation of the copper is used for a certain time. This solution contains from one to two and one-half per cent. free sulfuric acid and more than one per cent. copper, together with the other impurities from the ore. This solution is followed up by a second solution containing a larger percentage of free sulfuric acid, say five per cent, containing above one per cent. of copper and a small amount of impurities. This strong solution is followed up by a second batch of the weak or impure solution, which in turn is followed by wash water. This whole operation should take about seventy-two hours.

By the use of the two strengths of solutions, the amount of iron going into solution is cut down to a minimum, because the first solution is used until the major portion of the soluble iron has been removed from the ore, then the strong acid is added, which aids in removing the more difficultly soluble copper, and this is followed by the second portion of first or weak solution. The reason for this particular sequence is that the time required for extracting the copper content is reduced by the use of the strong acid, and by following up with the weak solution the acid loss due to entrainment in the tailings and wash water is kept down to a minimum. If the strong acid solution were used first, the iron increase would be too great and no iron would be precipitated in the ore column, which would necessitate the withdrawal from circulation and treatment by agitation with copper oxid material of a greater quantity of solution, thereby increasing the cost of treatment. If the strong acid solution were used at the finish of the leaching operation, the acid loss would be increased, thereby increasing the cost of the treatment.

The wash water, which always contains a little copper, and which has usually been thrown away, may be used in the agitation tank before mentioned, in order to take the place of the water lost from that tank by evaporation. Consequently, there is practically no loss of copper, because the latter is, of course, added to the copper in solution in the agitation tank.

The operation of the electrolytic precipitation is carried on in acidproof tanks, using insoluble lead anodes and copper starting sheets for cathodes. The solution is circulated at a rapid rate, and a current density of from fifteen to twenty amperes per square foot of cathode is used. The result is a copper suitable for wire bars.

The agitation treatment with copper oxid material removes iron, aluminum, nickel, cobalt, arsenic, antimony, bismuth, some manganese and all of the vanadium, thereby keeping the iron content of the solution to be electrolyzed under absolute control and at a point consistent with economical electrolytic precipitation. It also keeps the aluminum from interfering with rapid percolation, for it has been found that salts of aluminum seriously interfere with the free percolation of a solution through an ore column. It removes the arsenic, antimony and bismuth elements which seriously impair the grade of copper if allowed to accumulate in the solution, also the vanadium, nickel, and cobalt, which are quite valuable. It enables us to keep the specific gravity of the leaching solution at about 1.20 to 1.23, for it has been found that above this point percolation is hindered and washing out the last portion of the copper from the tailings requires an extensive amount of water. Furthermore, the agitation makes possible the recovery of the acid combined with the iron, alumina, etc., because the copper sulfate formed in the agitation tank returns this acid in the subsequent electrolytic operation, so that the net acid loss is confined to that entrained in the tailings, and that which is combined with the alkalis and alkaline earths.

The reactions involved in the several steps of the process may be set forth as follows:

Roasting.

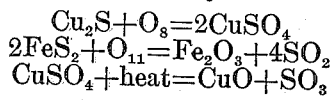
$$Cu_2S + O_3 = 2CuSO_4$$
$$2FeS_2 + O_{11} = Fe_2O_3 + 4SO_2$$
$$CuSO_4 + heat = CuO + SO_3$$

Leaching.

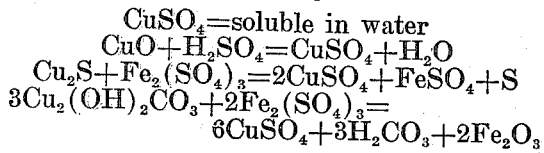
$$CuSO_4 = \text{soluble in water}$$
$$CuO + H_2SO_4 = CuSO_4 + H_2O$$
$$Cu_2S + Fe_2(SO_4)_3 = 2CuSO_4 + FeSO_4 + S$$
$$3Cu_2(OH)_2CO_3 + 2Fe_2(SO_4)_3 =$$
$$6CuSO_4 + 3H_2CO_3 + 2Fe_2O_3$$

Electrolysis.

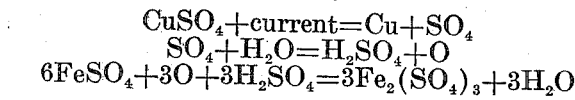
$$CuSO_4 + current = Cu + SO_4$$
$$SO_4 + H_2O = H_2SO_4 + O$$
$$6FeSO_4 + 3O + 3H_2SO_4 = 3Fe_2(SO_4)_3 + 3H_2O$$

Agitation tank.

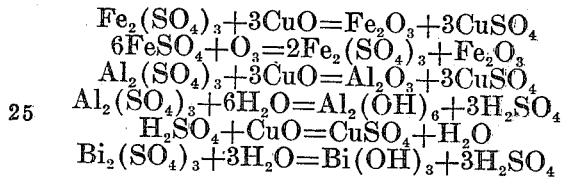
$$Fe_2(SO_4)_3 + 3CuO = Fe_2O_3 + 3CuSO_4$$
$$6FeSO_4 + O_3 = 2Fe_2(SO_4)_3 + Fe_2O_3$$
$$Al_2(SO_4)_3 + 3CuO = Al_2O_3 + 3CuSO_4$$
$$Al_2(SO_4)_3 + 6H_2O = Al_2(OH)_6 + 3H_2SO_4$$
$$H_2SO_4 + CuO = CuSO_4 + H_2O$$
$$Bi_2(SO_4)_3 + 3H_2O = Bi(OH)_3 + 3H_2SO_4$$

It is to be understood that in the following claims the scope of protection which we contemplate is set forth without reference to any limitations set out in the specification, except such as are necessarily implied. Furthermore, a due range of equivalents for the various materials, operations, and sequence of operations, is to be accorded in the interpretation of the claims. Thus, the method might be employed, *mutatis mutandis*, for the recovery of metals other than copper.

We claim:—

1. The improved cyclic method of extracting copper from copper-bearing material whose copper content is soluble in a sulfuric acid solution, comprising the leaching of the material with a solution of sulfuric acid, whereby the copper is converted into copper sulfate in solution, electrolyzing the solution containing the copper sulfate and regenerating sulfuric acid, returning the solution to the ore, and at some point in the circuit of the solution, when it becomes foul withdrawing a portion of the solution from the circuit, predetermined in amount in accordance with the amount of impurities necessary to be removed from the solution as a whole, eliminating impurities from the portion so withdrawn and returning it, purified, to the circuit.

2. The improved cyclic method of extracting copper from copper-bearing material containing iron and whose copper and some of its iron contents are soluble in a sulfuric acid solution, comprising the leaching of the material with a solution of sulfuric acid, whereby the copper is converted into copper sulfate in solution, electrolyzing the solution containing the copper sulfate and regenerating sulfuric acid, returning the solution to the ore, and at some point in the circuit of the solution, when it becomes foul withdrawing a portion of the solution from the circuit, predetermined in amount in accordance with the amount of impurities necessary to be removed from the solution as a whole, eliminating from the portion so withdrawn the iron content or a portion thereof and returning it, with the iron eliminated, to the circuit.

3. The improved cyclic method of extracting copper from copper-bearing material containing iron and aluminum and whose copper and some of its iron and aluminum contents are soluble in a sulfuric acid solution, comprising the leaching of the material with a weak solution of sulfuric acid, whereby the copper, iron and aluminum are converted into sulfates in solution, predetermined in amount in accordance with the amount of iron and aluminum in the total amount of solution, treating a portion of the solution with copper-oxid-bearing material to precipitate the iron and aluminum and increase the copper content of the portion of the solution, electrolyzing the said portion of solution to recover copper and regenerate sulfuric acid, and returning the solution of sulfuric acid to the body of material for further leaching of the same.

4. The improved cyclic method of extracting a metal from an ore containing it in cases where the metal content is soluble in an acid solution, comprising the leaching of the ore with a solution of such acid whereby the metal is converted into a soluble salt of the metal, electrolyzing the solution containing the salt, returning the solution to the leach, and at a suitable point in the circuit of operations, when the solution becomes foul withdrawing a portion of the solution predetermined in amount in accordance with the amount of impurities necessary to be removed from the solution as a whole, eliminating impurities from the portion so withdrawn, electrolyzing, and returning it purified for further use in the cycle.

5. The improved cyclic method of extracting a metal from an ore containing it in cases where the metal content is soluble in an acid solution, comprising the leaching of the ore with a solution of such acid whereby the metal is converted into a soluble salt of the metal, electrolyzing the solution containing the salt, returning the solution to the leach, and at a suitable point in the circuit of operations, when the solution becomes foul withdrawing a portion of the solution, predetermined in amount in accordance with the amount of impurities necessary to be removed from the solution as a whole, eliminating impurities from the portion so withdrawn, by treating it with material bearing the metal whose recovery is sought, electrolyzing, and returning it purified for a new use in the cycle.

6. The improved cyclic method of extracting a metal from an ore containing it in cases where the metal content is soluble in an acid solution, comprising the leaching of the ore with a solution of such acid whereby the metal is converted into a soluble salt of the acid, electrolyzing the solution containing the salt and acid, returning the solution to the leach, and at a suitable point in the circuit of operations, when the solution becomes foul withdrawing a portion of the solution, predetermined in amount in accordance with the amount of impurities necessary to be removed from the solution as a whole, eliminating impurities from the portion so withdrawn by treating it with an oxid of the metal whose recovery is sought, electrolyzing, and returning it purified for a new use in the cycle.

In testimony whereof we affix our signatures in presence of two witnesses.

FREDERICK J. POPE.
ALBERT WILLIAM HAHN.

Witnesses:
S. F. FRENCH,
GEO. O. HOWE.